United States Patent [19]
Leland

[11] Patent Number: 4,883,126
[45] Date of Patent: Nov. 28, 1989

[54] RIDGE PLANTER GUIDE UNIT

[76] Inventor: Gregory Leland, P.O. Box 130, Bricelyn, Minn. 56014

[21] Appl. No.: 312,757

[22] Filed: Feb. 21, 1989

[51] Int. Cl.⁴ .............................................. A01B 69/00
[52] U.S. Cl. ..................... 172/26; 172/572; 172/710; 172/583
[58] Field of Search ................... 172/23, 26, 176, 178, 172/538, 539, 551, 560, 536, 572, 573, 710, 621, 705; 111/52, 85; 47/1.7

[56] References Cited

U.S. PATENT DOCUMENTS

| 330,022 | 11/1885 | Harter | 172/151 X |
|---|---|---|---|
| 1,030,244 | 6/1912 | Payne | 111/85 |
| 1,266,542 | 3/1917 | Alam | 111/63 |
| 1,421,371 | 7/1922 | Attaway | 172/187 X |
| 1,895,962 | 1/1933 | Bateman et al. | 111/14 |
| 1,901,299 | 3/1933 | Johnson | 172/536 |
| 1,993,649 | 3/1935 | Crutcher | 111/73 |
| 2,053,390 | 9/1936 | Bateman et al. | 222/130 X |
| 2,567,107 | 9/1951 | Gobeil | 172/4 |
| 3,116,806 | 1/1964 | Rose | 172/26 X |
| 3,124,202 | 3/1964 | Van Dyk | 172/176 X |
| 4,213,505 | 7/1980 | Jolley | 47/1.7 X |
| 4,333,535 | 6/1982 | Hentrich, Sr. | 172/572 |
| 4,396,070 | 8/1983 | Brandner et al. | 172/710 X |
| 4,520,876 | 6/1985 | Peterson et al. | 172/26 X |
| 4,702,323 | 10/1987 | Smit et al. | 172/26 X |
| 4,796,550 | 1/1989 | Van Natta et al. | 172/536 X |

FOREIGN PATENT DOCUMENTS

| 1205709 | 2/1960 | France | 172/538 |
|---|---|---|---|
| 1350137 | 12/1963 | France | 172/573 |
| 2869 | of 1879 | United Kingdom | 172/26 |

OTHER PUBLICATIONS

"Orthman Phase II Tracker", Sales Brochure, Orthman Manufacturing, Inc., Aug. 1984.
Case Rear Mounted Cultivator Sales Brochure, J. I. Case Company, Sep. 1972.
Behn, "Ridgemate", Ernie Behn, Best of Farm Show, Dec. 1985.

Primary Examiner—Richard J. Johnson
Assistant Examiner—Jeffery L. Thompson
Attorney, Agent, or Firm—James R. Cwayna

[57] ABSTRACT

This invention relates to a planter guide attachment designed to hold and align conventional corn, soybean planters, or other units on the upper area of a ridge of soil formed by previous cultivation-ridging processes as known in Ridge-Till farming. The unit provides a mounting shaft having a pair of coned blades mounted thereon to allow the tapered faces of the disc blades to hug the sides of the ridges for proper planter alignment. The shaft blade construction is hingedly attached to a mounting bar which is vertically adjustably attached to a tool bar extending transversely of the rear of a towing vehicle for mounting a plurality of guide units thereon. A knee spring-action mechanism is provided to load the shaft, disc structure to maintain the same in ground contacting position, and allow the same to override obstacles that may be in the ridge, and thereafter return the same into ground-contacting position along the sides of the ridge. The knee action includes a counteracting spring having an adjustable actuating shaft attached to the disc combination. This counteracting spring mechanism is adjustable to permit a high lift factor to override obstacles and maintain downward pressure to bring the discs into ground engagement and into contact with the sides of the ridge. Scraper blades are also provided adjacent each of the discs for cleaning the same.

8 Claims, 3 Drawing Sheets

RIDGE PLANTER GUIDE UNIT

FIELD OF THE INVENTION

This invention relates generally to planting devices, and more specifically to a planter guide unit particularly adaptable for Ridge-Til farming techniques to properly guide planting or plant treating devices and maintain the same in alignment with the uppermost surface of a preformed ridge.

SHORT SUMMARY OF THE INVENTION

As illustrated and described herein, the ridge planter guide unit is a singular structure mountable on a transversely extending tool bar for towing behind a vehicle. A plurality of individual units are normally provided on a tool bar for accommodating the guiding of a number of planting devices. The technique and system is particularly designed for utilization for what is known as Ridge-Til farming techniques wherein the seeds are planted on raised ridges as compared to flat land farming techniques.

Each individual unit includes a stationary mounting bar having one end thereof provided with clamp means which allow for horizontal adjustability along the tool bar and vertical adjustability with respect to the tool bar for initially positioning the stationary mounting bar with the other end thereof hingedly receiving a vertically shiftable mounting bar having a lever on one end thereof and a pair of inwardly directed conically shaped discs on the other end thereof. Between the lever of the vertically shiftable mounting bar and the stationary bar is a biasing member which will apply a downward force to the vertically shiftable bar and thus to the conical discs. The pair of conical discs are mounted on a transfer shaft positioned on the vertically shiftable bar. The biasing member is pivotally attached to the lever of the vertically shiftable bar and the mounting therefore includes a spring housing rigidly attached to the stationary mounting bar such that a compression spring housed therein will provide the effective force for downward application of pressure to the shiftable bar and thus to the discs.

By adjusting the tension of the spring, the downward pressure of the discs is maintained to keep the discs in soil contact. The adjustable spring tension allows the operator to substantially fine-tune the discs to adapt to a variety of soil types and conditions. A high degree of adjustability is provided with the applicant's unit to afford overriding of obstacles that may be encountered as the unit is towed or pushed through the ridged field. The knee action arrangement of the spring and associated mounting and actuating bars permits a high degree of flexibility in upward and downward movement while maintaining the associated planting devices in proper relation to the formed ridges.

In addition to the above, scraper elements are provided on the innermost sides of the discs for removal of accumulated dirt to maintain the discs in a clean condition for proper ridge contact.

BACKGROUND AND OBJECTS OF THE INVENTION

Ridge-Til is a farming technique wherein defined ridges are formed and the seed to be planted is placed directly on the uppermost surface of the ridge. It has been found that there are certain advantages to this farming technique as compared to what is known as flat field farming. One particular advantage is water and washout control, and another is the ease of weed control. Use of this particular technique has grown in the last several years, and one particular area of difficulty and importance to which applicant's unit provides the solution is proper guiding of the planter units to place the seed into the uppermost surface of the formed ridge.

Applicant has knowledge of commercial available units and has found no units which incorporate the concepts of the included design, which basically provides for a vertically moveable guiding unit to accomplish proper guiding and to permit override of obstacles and normally maintain the guiding elements in proper ground contact.

The applicant has also searched the prior applicable patent art and has found the following list of applicable patents. These are: Payne, U.S. Pat. No. 1,030,244; Bateman et al, U.S. Pat. No. 2,053,390; Harter, U.S. Pat. No. 330,022; Alam, U.S. Pat. No. 1,266,542; Crutcher, U.S. Pat. No. 1,993,649; Bateman et al, U.S. Pat. No. 1,895,962.

The two patents to Bateman and the patents to Crutcher and Payne each disclose a pair of guiding discs but do not provide a downwardly directed biasing member to maintain discs in ground contact or to allow them to ride up over obstructions and return to the ground thereafter. The Payne patent does allow for upward mobility but does not provide for a loaded downward force.

The patents to Alam and Harter each provide a pair of guiding discs with means for spring loading the same and the Alam patent discloses, only through interpretation, that a certain degree of adjustability may be made to the spring load. The Alam patent also discloses a device which is in combination with a planting tool, but it does not allow for the adjustability and range of operative adjustment that is provided with the applicant's unit. The Harter unit includes a spring mechanism with minimal or no adjustable features associated therewith.

In addition to these statements regarding the prior art it should also be considered that the Crutcher patent provides disc round openers and not guiding members. Bateman U.S. Pat. No. 2,053,390 utilizes the discs cover placed seed and this is also true in Bateman U.S. Pat. No. 1,895,962. Again, the Payne patent provides a seed covering device while the Alan patent utilizes the discs for driving the seed dropping mechanisms. The Harter patent does not utilize the discs in any manner which could be construed as guiding.

Applicant's device provides a high degree of adjustability for accomodation of differences in planter operating heights as well as various tractor tire sizes, and the spring combination, providing knee action to the guiding discs affords a high range of operative considerations. The unit provided herein permits the guide discs to maintain ground contact and return to proper ground contact after overriding obstacles.

The objects of the invention are basically to provide a guide unit for guiding along formed ridges in Ridge-Til farming techniques to effectively and properly guide planter mechanisms associated therewith into proper seed locating positions on the uppermost surfaces of the ridges.

The objects also include a downwardly directed loading pressure upon the guide discs to maintain the same in ground contact, thus maintaining the ridge and aligning the planter unit along the ridge.

Additional objects and advantages of the applicant's invention will become obvious with a consideration of the accompanying drawings and disclosure of the invention.

SHORT DESCRIPTION OF THE DRAWINGS

DESCRIPTION OF A PREFERRED FORM OF THE INVENTION

Figure 1:
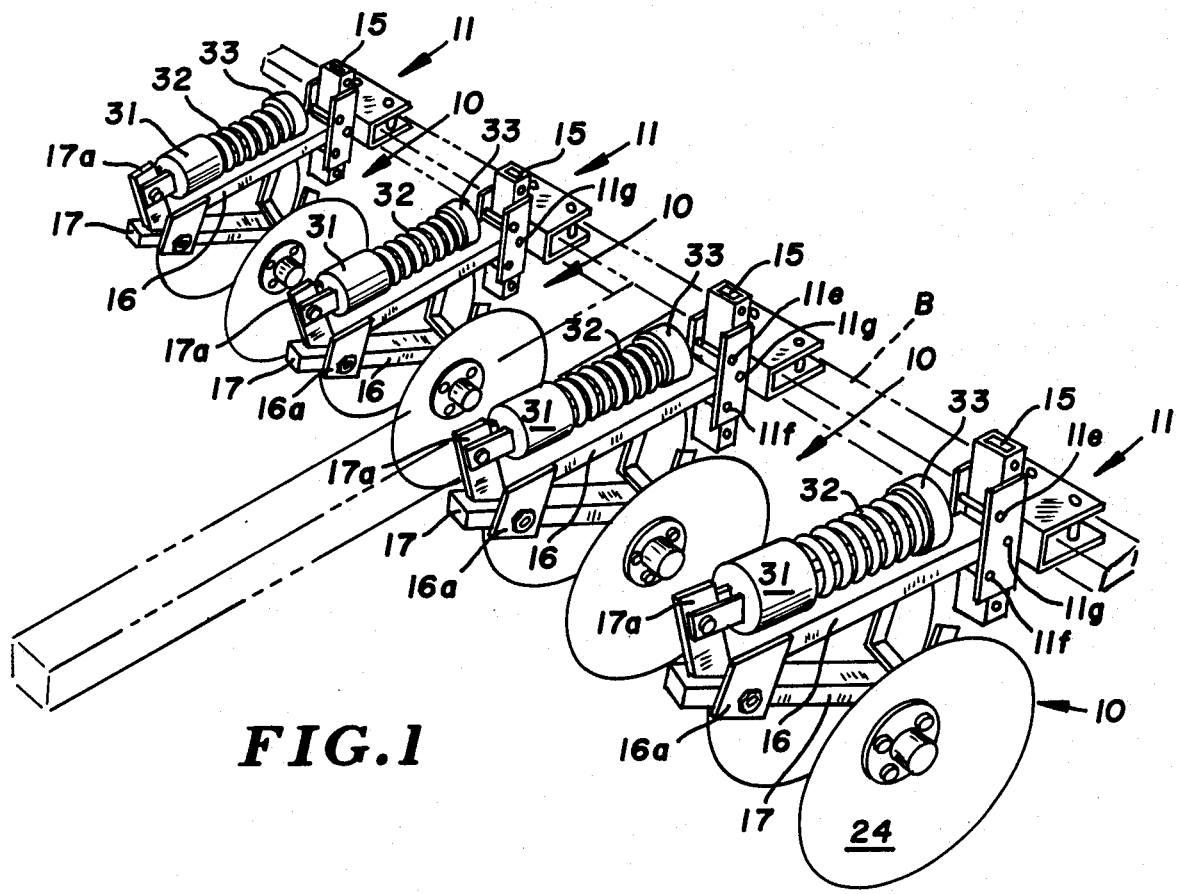
FIG. 1 is a perspective view of a tool bar, shown in phantom lines, having a plurality of planter guide units mounted transversely thereacross, which guide units incorporate the concepts of the applicant's invention.

In accordance with the accompanying drawings, the planter guide unit embodying the concepts of the applicant's invention is designated in its entirety 10. As illustrated in FIG. 1, a plurality of such guide units 10 are shown in operative position on a transversely extending mounting bar B which is arranged for towing behind a tractor or the like.

In the various drawings, the unit 10 is illustrated for towing but it should be obvious that the unit 10 may be pushed by locating the same forward of a tractor.

The associated and guided planters are not illustrated in this view, but the planters would be arranged directly upon bar B or may be arranged on either preceding or succeeding mounting bars which are similarly and simultaneously towed or pushed by a tractor across the served field and are responsive to the tracking of the guide units 10 on the formed ridges.

Figure 4:
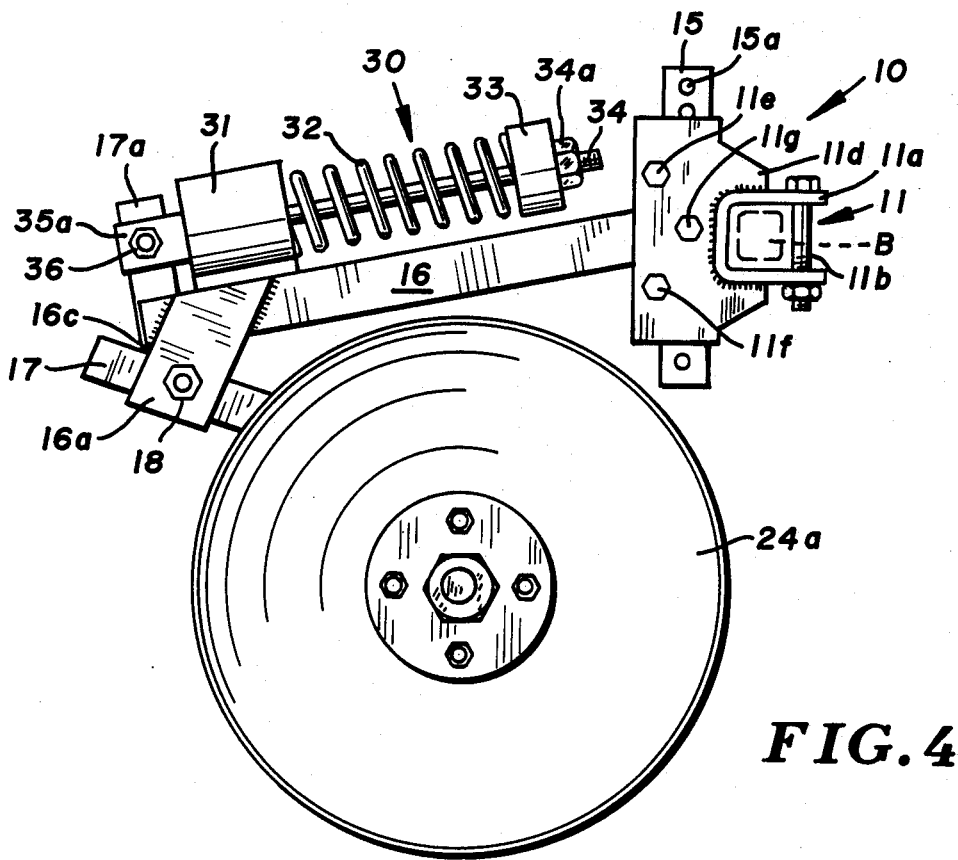
FIG. 4 is a side elevation thereof.
Figure 5:
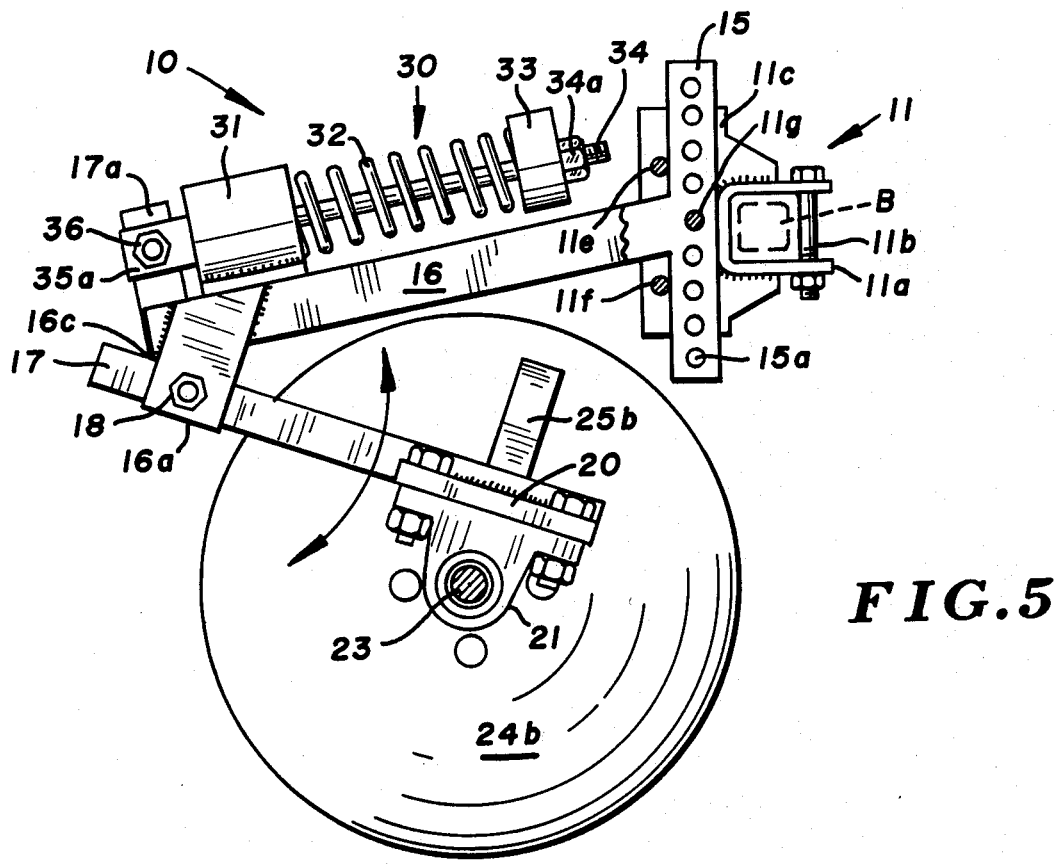
FIG. 5 is a vertical section taken substantially along Line 5—5 of FIG. 3.
Figure 6:
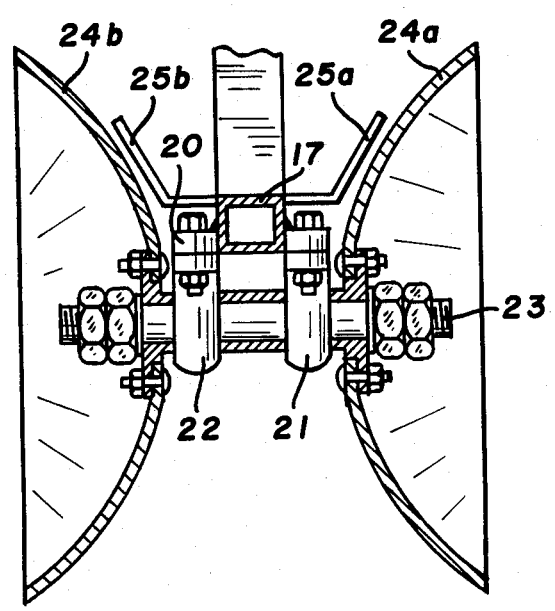
FIG. 6 is a vertical section taken substantially along Line 6—6 of FIG. 3.

For attachment to the mounting bar B, an attachment bracket 11 is provided and this attachment bracket includes a first, generally U-shaped member 11a of a size to be received about bar B and includes a pair of fastener or clamping elements 11b to enable clamping thereof about mounting bar B. This mounting situation is best illustrated in FIGS. 4 and 5 of the drawings. Such mounting permits adjustment of the guide units 10 along the transverse dimension of bar B in accordance with the ridges and spacing between the ridges of the field.

Rigidly positioned upon the clamping element of 11a are a pair of spaced, vertically arranged guiding and securing members 11c, 11d. These members 11c, 11d, provide a vertically oriented guide slot for positionable receipt of the remaining portions of the guide unit 10 therein. As illustrated, a pair of clamp elements are arranged to cooperate with the vertical guide members 11c, 11d for clamping the same against a vertical adjustment member 15 of unit 10. Again, as illustrated, this vertically adjustable element 15 is provided with a plurality of locating apertures 15a extending transversely therethrough, and these apertures, in cooperation with an insertable placement member 11g, and side elements 11c, 11d, afford a first vertical adjustment arrangement for initially positioning the guide unit 10 relative to the mounting bar B. The vertical mounting adjustment allows for differences in planter operating height as well as allowance for various tractor tire sizes.

Extending forwardly from the vertically adjustable bar element 15 is a first stationary mounting arm 16, angularly offset to the vertically adjustable bar 15. A pair of attachment ears 16a, 16b are arranged at the forwardmost end of arm 15 to hingably receive a vertically moveable mounting bar 17, through connective member 18. Obviously, the two downwardly extending arms 16a, 16b form a trunnion arrangement for oscillation of moveable bar 17 therebetween, as is illustrated by the movement arrows of FIG. 5.

Disc mounting means are arranged at the rearmost end of the moveable mounting bar 17, and in the form shown, a transversely extending mounting block 20, is provided at the rearmost end of moveable bar 17 and a pair of pillow blocks 21, 22 or the like are attached to plate 20 for mounting of a transversely extending shaft 23 therebetween and therethrough. A pair of conical disc members 24a, 24b are mounted on the respective ends of shaft 23 and shaft 23 is provided with threaded ends to accommodate attachment members such as nuts, washers, or the like to positively hold the discs 24a, 24b upon shaft 23. Obviously, in utilization of the unit, the discs 24a, 24b may become damaged, and replacement may be required and this particular aspect of the applicant's device is not considered to be new and unique, in that replaceable discs are common in various agricultural situations.

Figure 2:
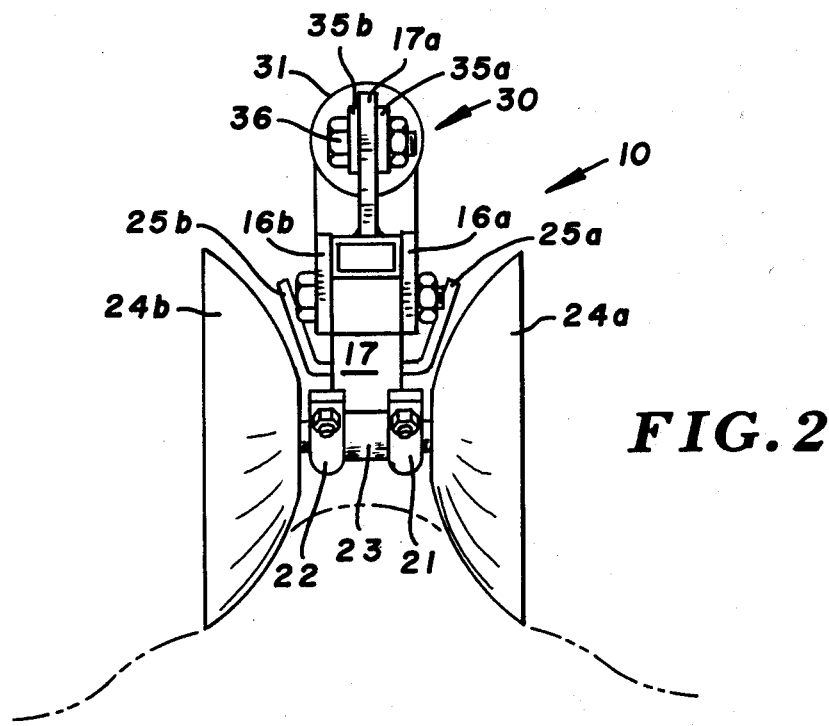
FIG. 2 is a front elevation of a single planter guide unit illustrating same in operative position adjacent a formed ridge.
Figure 3:
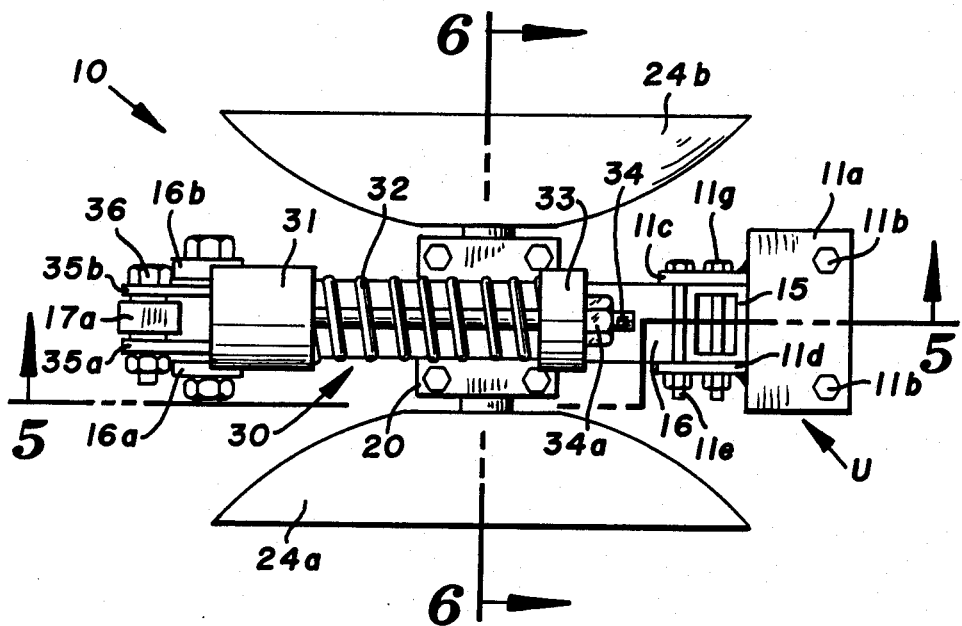
FIG. 3 is a top plan view of the guide unit.

As illustrated in FIG. 2, a pair of disc cleaning elements 25a, 25b are secured to moveable bar 17 and positioned to scrape and clean the discs 24a, 24b as they move therepast. Obviously, in a guiding situation it is preferable that such disc elements are cleared of dirt and other debris for properly guiding upon the preformed ridge.

An operative link 17a is provided on the forward end of moveable arm 17 for actuation and movement of arm 17 through a spring assembly designated in its entirety 30. Spring assembly element 30 provides a downwardly exerted force to normally hold the discs 24a, 24b in ground contact while allowing the same to swing upwardly over various obstructions that may be encountered in transversing the field.

As illustrated, spring assembly 30 includes a first housing 31, rigidly secured to the forward end of stationary arm 16, which housing provides a capturing area to receive one end of compression spring 32. Spring 32 extends from housing 31 to a rearwardly located cap end 33. The housing and end cap 31, 33 are simply means for containing the ends of spring 32.

An operating rod 34 with cooperative adjustment means 34a for compressing and tensioning the spring 32 are provided in cooperation with the cap 33 and this operating rod 34 extends generally centrally through spring 32 to a pair of connective ears 35a, 35b which are in turn attached to the operative link 17a or arm 17 by fastener 36. Threaded means to receive the threaded end of rod 34 are located within housing 33.

The operation of the biasing spring assembly 30 in cooperation with the moveable arm member 17 and associated discs 24a, 24b should be obvious. Upon movement of the adjustment element 34a, pressure exerted by the spring 32 is adjusted to desired, proper operating force. Obviously, the preset compression of spring 32 will cause either an increase or decrease of pressure to the operative link 17a of arm 17 and will thereby increase or decrease the downwardly directed force upon the discs 24a, 24b. Stop means through abutment of the arms as at 16c, FIG. 5 are provided to prevent overrun of the discs, and the downward total movement is limited through the design of the appropriate arms 16, 16a, 16b, 17, lug 17a, and the spring-rod arrangement 32, 34. The aspect of the spring arrangement is to provide a continuous and continual downward force upon the discs 24a, 24b while permitting upward movement thereof to override obstructions which may be encountered as the unit is towed or pushed over a field.

Operation of the unit should be obvious to anyone skilled in the art. A first adjustment is obtained through placement of the vertical adjustment bar 15 into the tool bar mount brackets 11c, 11d and placement of pin 11g. After such initial placement, required spring force is obtained through adjustment of element 34a along the operative shaft 34. Such adjustment will increase or decrease the spring pressure exerted by the compression spring 32 to thereby control and fine-tune the downward pressure on the discs 24a, 24b. This pressure adjustment is important, depending upon the particular soil conditions and soil makeup in that the formation and maintenance of the ridges into which the seeds are being placed is important and a properly selected pressure will ensure maintenance of the ridge without collapsing the same into a flat condition.

The advantages of the applicant's guide unit should be obvious to one skilled in the art.

Obviously, a selected planter unit or a fertilizer or defoliant unit is arranged in alignment with these guide units, and the guide unit will maintain the operative unit in proper relationship to the preformed ridge such that the seeds are properly placed or fertilizers or defoliant is properly placed onto the ridge.

What is claimed is:

1. A guide unit arranged and adapted for mounting on a tool bar of a towed vehicle for guiding and maintaining seed planters and the like in operative position over preformed ridges, said guide unit including:
   a. a first clamping member arranged and constructed to be received about and clamped to the tool bar;
   b. a first stationary bar rigidly fixed to and extending forwardly of said first clamping member;
   c. a second vertically moveable mounting bar hingedly attached to a forward end portion of said first stationary bar;
   d. a pair of laterally spaced concave-convex disc members having facing convex surface rotatably mounted on said second bar positioned for contacting the sides of a preformed ridge for guiding therealong; and,
   e. biasing means mounted on said first stationary bar and arranged and constructed for operative movement of said second, moveable mounting bar to normally urge said second bar and said discs into ground contacting relation whereby the position of the vehicle is controlled to maintain its position over the uppermost ridge surface.

2. The structure set forth in claim 1 and said first clamping member including:
   a. vertical guide means; and,
   b. said vertical guide means including a plurality of positioning means arranged vertically thereon, said first stationary bar including a vertical guide element at the rearward end thereof receivable into said vertical guide means and selectively positionable vertically therein.

3. The structure set forth in claim 2 and said vertical guide means including:
   a. a pair of plate members;
   b. a plurality of spaced apertures formed through said plate members; and,
   c. fastening means arranged to extend through said plate members and said first stationary bar to selectively position said first stationary bar relative to said clamp member and the tool bar.

4. The structure set forth in claim 1 and said second, moveable mounting bar being hingedly attached to said stationary bar at the forwardmost end thereof.

5. The structure set forth in claim 4 and said biasing means including:
   a. a compression spring means including a compression spring arranged on said first stationary bar;
   b. a control rod extending from said spring means to said second, moveable mounting bar for normally urging the same downwardly into ground contact.

6. The structure set forth in claim 5 including:
   a. means for mounting said compression spring having a first housing arranged on said first stationary bar for retaining one end of said spring; and,
   b. said rod being arranged generally centrally of said spring extending from a free end thereof to said second, moveable mounting bar.

7. The structure set forth in claim 6 including:
   a. means for adjusting the compressive force of said spring.

8. The structure set forth in claim 7 and said adjustment means including:
   a. an end cap arranged on the free end of said spring;
   b. said rod passing through said spring and said end cap; and,
   c. adjustment means for moving said spring relative to said rod whereby the compressive force of the spring is modified by increasing or decreasing the effective length of said spring.

* * * * *